J. H. GRISWOLD AND O. H. LUTZ.
CONTROL FOR ELECTRIC LIGHTING SYSTEMS ON VEHICLES.
APPLICATION FILED SEPT. 26, 1916.
1,361,048.
Patented Dec. 7, 1920.
2 SHEETS—SHEET 1.
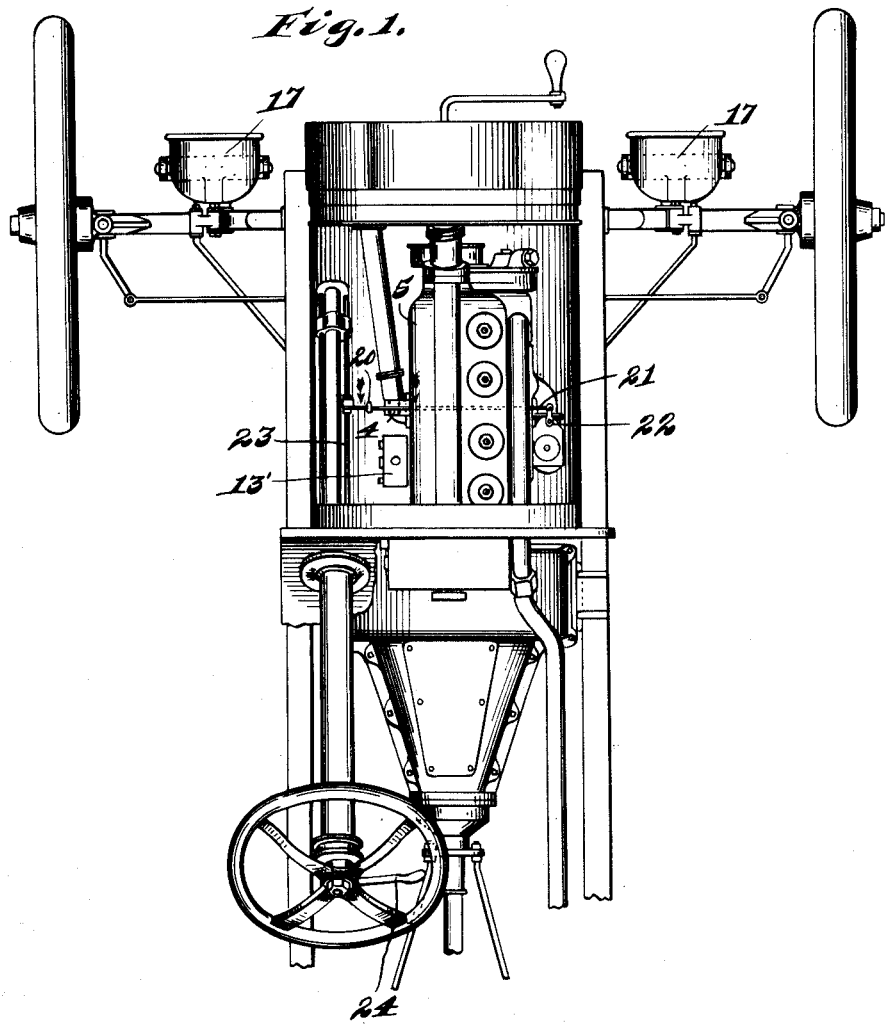
WITNESSES:
Inventors:
Jesse H. Griswold,
And
Otto H. Lutz,
BY
their ATTORNEY.

J. H. GRISWOLD AND O. H. LUTZ.
CONTROL FOR ELECTRIC LIGHTING SYSTEMS ON VEHICLES.
APPLICATION FILED SEPT. 26, 1916.
1,361,048.
Patented Dec. 7, 1920.
2 SHEETS—SHEET 2.
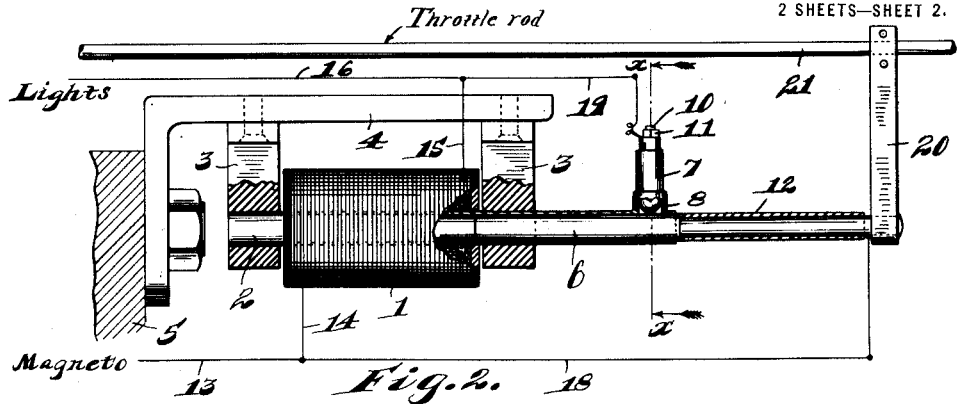
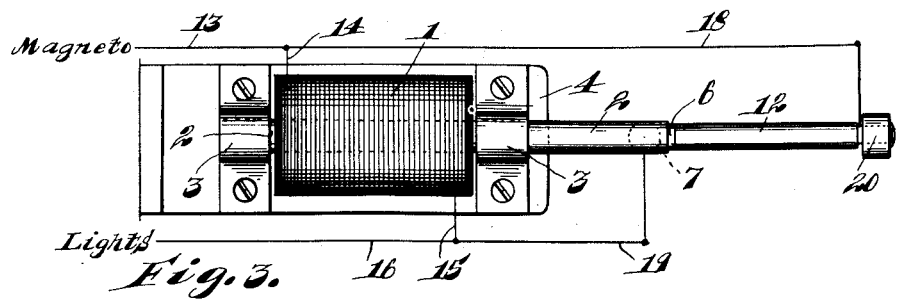
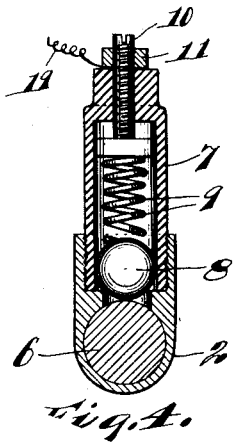
WITNESSES:
E. E. Wessels.
A. A. Olson.
Inventors:
Jesse H. Griswold,
And
Otto H. Lutz,
BY Joshua R. H. Potts
their ATTORNEY.

UNITED STATES PATENT OFFICE.

JESSE H. GRISWOLD AND OTTO H. LUTZ, OF ZION CITY, ILLINOIS, ASSIGNORS, BY MESNE ASSIGNMENTS, OF ONE-HALF TO JOSHUA R. H. POTTS, OF CHICAGO, ILLINOIS.

CONTROL FOR ELECTRIC-LIGHTING SYSTEMS ON VEHICLES.

1,361,048.   Specification of Letters Patent.   Patented Dec. 7, 1920.

Application filed September 26, 1916. Serial No. 122,229.

*To all whom it may concern:*

Be it known that we, JESSE H. GRISWOLD and OTTO H. LUTZ, citizens of the United States, and residents of Zion City, county of Lake, and State of Illinois, have invented certain new and useful Controls for Electric-Lighting Systems on Vehicles, of which the following is a specification.

Our invention relates to a control for electric lighting systems on vehicles, the present arrangement being designed for use especially in connection with Ford automobiles.

In automobiles of the manufacture mentioned, the electric lights are furnished with current which is generated by the magneto when the engine is running. This being the case, the lights are very dim when the engine is running slow, and are extremely bright, frequently resulting in burning out of the same, when the engine is running fast.

The object of the present invention is to provide an automatic control whereby the lights in a motor vehicle having a lighting system, as above mentioned, will be maintained at a constant brightness, notwithstanding that the speed of the motor may vary.

A further object is the production of a control mechanism which will be entirely automatic, and which will be of economical construction and efficient in use. Other objects will appear hereinafter.

The invention consists in the combinations and arrangements of parts hereinafter described and claimed.

The invention will be best understood by reference to the accompanying drawings forming a part of this specification, and in which, Figure 1 is a top plan view of the front end portion of the chassis of a motor vehicle equipped with an electric light control mechanism, embodying the invention, Fig. 2, an enlarged partially sectional side elevation of the control mechanism, Fig. 3, a bottom plan view thereof, and Fig. 4, an enlarged section taken on line *x—x* of Fig. 2.

The preferred form of construction as illustrated in the drawings comprises an electric impedance coil 1 which is wrapped upon a tubular hub or guide 2 which is mounted in supports 3 of insulating material, the latter being suitably fastened to a bracket 4 which is adapted to be suitably mounted upon one side of the engine or motor 5 in connection with which the device is employed.

Slidably mounted in the member 2 of the impedance coil is a core 6 of soft iron or other magnetizable material. Said core is adapted to be slid into registration with said coil or to be moved outwardly from registration therewith, as shown in Fig. 2. Coöperating with core 6 is a contact member 8 in the form of a ball or wheel which is mounted in a suitable housing 7 of insulating material which is mounted upon the extended end of member 2. A helical compression spring 9 coöperates with the contact member 8 for normally pressing the same toward the core 6 as clearly shown in Fig. 4. In the upper end of housing 7 is threaded a screw 10 having a head at its inner end adapted to engage against the upper end of spring 9, whereby the tension of said spring may be adjusted through adjustment of said screw. Coöperating with the outer end of said screw is a lock nut 11. The screw 10 and nut 11 serve also as a binding post for a conductor wire as will be hereinafter described. The outer end of core 6 is slightly reduced in diameter, and arranged upon the same is a sleeve 12 of insulating material. With this arrangement, when the core 6 is moved toward the coil 1, or toward operative position, the insulating sleeve 12 will be brought into engagement with the contact 8 and thus serve to break any circuit which would otherwise exit from said core through said contact.

In use, the construction described having been suitably mounted upon one side of the vehicle motor or arranged at other suitable location, the main circuit wire 13 of the lighting system, which wire leads from the magneto 13' of the motor, is connected by means of a branch wire 14 with one end of the coil 1. The opposite end of said coil is connected by means of a branch wire 15 with the main circuit wire 16 of the lighting system, leading to the lights 17 of the vehicle. The return of the circuit from the lights to the magneto is through the ground, suitable terminals being grounded for this purpose as is the usual construction. A branch wire 18 is also extended from the circuit wire 13 to the outer end of core 6, a branch wire 19 being extended from the binding post constituted by screw 10 and nut 11 to the main circuit wire 16.

The outer end of core 6 is rigidly connected by a connecting bar or arm 20 to a rod 21 provided in a conventional Ford automobile which connects the throttle valve 22 with the rockingly mounted stem 23 to which the adjusting handle or lever 24 arranged upon the steering wheel of the automobile is connected. The operation of the control lever 24 is such, as is generally understood, that the rod 21 is moved longitudinally in the opening and closing of the valve, said rod being moved to the left when the throttle valve is opened and to the right when the throttle valve is closed.

With this arrangement it will be seen that in the opening of the throttle valve, the core 6 will be correspondingly moved to the left into the coil 1, and, in the closing of the throttle valve, said core will be moved to the right or out of registration with said coil.

With this arrangement, in the operation of the engine, when the throttle valve is closed or only partly open, the current of the electric lighting system will pass from the wire 13 through the wire 18, thence through the core 6 to the contact member 8, thence through the wire 19 to the main circuit wire 16 and thence to the lights. No resistance will thus be offered to the passage of the current and the lights will be as brilliant as the magneto permits. When the throttle valve is moved to open position or when the engine is running fast, the core 6 will be shifted to the left, bringing the insulating sleeve 12 into engagement with the contact 8. Thus the circuit above traced will be broken and the current will be required to pass from the main circuit wire 13 through the branch wire 14, through coil 1 and thence through the branch wire 15 to the main circuit wire 16. In Ford automobiles, an alternating current is used in the lighting system, so that in the insertion of the core 6 into the coil 1 or into the field of the latter an impedance is introduced into the circuit of which said coil is a part, such impedance being increased as the core is moved to the left or as a greater portion of the same comes into registration with said coil. This being the case, as the engine moves faster and the magneto therefore generates more current, the impedance offered by the coil 1 will be increased, thus serving to control the current passing through the lights and to consequently maintain the same at a constant or uniform brilliancy. The core 6 being rigidly connected with the connecting rod 21 which actuates the throttle valve, the control mechanism of the lights will be automatically controlled in the adjustment of the throttle valve from the lever 24 as will be readily understood.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. The combination of a generator; an electric circuit supplied with current by said generator; a coil connected with said circuit; a motor connected to drive said generator; an adjustable core for said coil; a valve controlling the speed of said motor; and means for simultaneously adjusting said core and valve, substantially as described.

2. The combination of a generator; an electric circuit supplied with current by said generator; a coil connected with said circuit; a motor connected to drive said generator; an adjustable core for said coil; a valve controlling the speed of said motor; means for operating said valve; and an operative connection between said valve operating means and said core, substantially as described.

3. The combination with an alternating electric light circuit, and a throttle valve of a motor driven vehicle, of an impedance coil interposed in said circuit; a core of magnetizable material coöperating with said coil and adapted for adjustment longitudinally of said coil; and means for simultaneously adjusting said valve and said core, substantially as described.

4. The combination with an alternating electric light circuit, and a throttle valve of a motor driven vehicle, of an impedance coil interposed in said circuit; a core of magnetizable material coöperating with said coil and adapted for adjustment longitudinally of said coil; and manually operable means for simultaneously adjusting said valve and said core, substantially as described.

5. The combination with an alternating electric light circuit, and a throttle valve of a motor driven vehicle, of an impedance coil interposed in said circuit; a core of magnetizable material coöperating with said coil and adapted for adjustment longitudinally of said coil; and means for simultaneously adjusting said valve and said core whereby the resistance in said circuit will be varied in direct proportion to the opening of said valve, substantially as described.

6. The combination with an alternating electric light circuit, and a throttle valve of a motor driven vehicle, of a variable impedance element interposed in said circuit; and means for simultaneously adjusting said valve and said impedance element whereby the resistance in said circuit will be varied in direct proportion to the opening of said valve, substantially as described.

7. The combination with an alternating electric light circuit, and a throttle valve of a motor driven vehicle, of a variable resistance element interposed in said circuit; means for simultaneously adjusting said valve and said impedance resistance element whereby the impedance in said circuit will be varied in direct proportion to the opening of said valve; and means for bridging said impedance element when said valve is only slightly open, substantially as described.

8. The combination with an alternating electric light circuit, and a throttle valve of a motor driven vehicle, of an impedance coil interposed in said circuit; a core of magnetizable material coöperating with said coil and adapted for adjustment longitudinally of said coil to vary the inductive resistance; means for simultaneously adjusting said valve and core whereby the resistance in said circuit will be varied in direct proportion to the opening of said valve; and means for bridging said resistance coil when said valve is only slightly open, substantially as described.

9. The combination with an alternating electric light circuit, and a throttle valve of a motor driven vehicle, of an impedance coil interposed in said circuit; a core of magnetizable material coöperating with said coil and adapted for adjustment longitudinally of said coil to vary the inductive impedance; means for simultaneously adjusting said valve and core whereby the impedance in said circuit will be varied in direct proportion to the opening of said valve; means for bridging said impedance coil when said valve is only slightly open, said last mentioned means comprising a contact adapted, when said core is in non-registering position relative to said coil, to engage against said core to close the circuit through said core; and an insulation on said core adapted, when said core is moved into registration with said coil to engage with said contact and break the circuit, substantially as described.

10. The combination with an alternating electric light circuit, and a throttle valve of a motor driven vehicle, of an impedance coil interposed in said circuit; a core of magnetizable material coöperating with said coil and adapted for adjustment longitudinally of said coil to vary the inductive impedance; means for simultaneously adjusting said valve and core whereby the impedance in said circuit will be varied in direct proportion to the opening of said valve; means for bridging said impedance coil when said valve is only slightly open, said last mentioned means comprising a spring pressed contact adapted, when said core is in non-registering position relative to said coil, to engage against said core to close the circuit through said core; and an insulation on said core adapted, when said core is moved into registration with said coil to engage with said contact and break the circuit, substantially as described.

11. The combination with an alternating electric light circuit, and a throttle valve of a motor driven vehicle, of an impedance coil interposed in said circuit; a core of magnetizable material coöperating with said coil and adapted for adjustment longitudinally of said coil to vary the inductive impedance; means for simultaneously adjusting said valve and core whereby the impedance in said circuit will be varied in direct proportion to the opening of said valve; means for bridging said impedance coil when said valve is only slightly open, said last mentioned means comprising a contact adapted, when said core is in non-registering position relative to said coil, to engage against said core to close the circuit through said core; an insulation on said core adapted, when said core is moved into registration with said coil to engage with said contact and break the circuit; a spring for pressing said contact into engagement with said core; and means for adjusting the tension of said spring, substantially as described.

12. The combination of a generator, a translation circuit including translating means supplied by the generator, means for driving the generator at different speeds, means affecting the speed of the driving means, means for controlling the voltage applied to the translating means in the translation circuit and means whereby the speed affecting means controls the voltage controlling means to minimize variations in the current traversing the translating means produced by changes in the speed of the generator.

13. The combination of a generator; a lighting circuit supplied by said generator; a motor to drive the generator; means controlling the speed of the motor; and means operable by said speed controlling means for controlling the current in said lighting circuit.

14. The combination of a generator; a lighting circuit supplied by said generator; an internal combustion engine connected to drive the generator; a throttle valve controlling said engine; means for operating said throttle valve; and means operable by said valve operating means for controlling the current in said lighting circuit.

In testimony whereof we have signed our names to this specification in the presence of two subscribing witnesses.

JESSE H. GRISWOLD.
OTTO H. LUTZ.

Witnesses:
 JOSHUA R. H. POTTS,
 B. G. RICHARDS.